United States Patent [19]

Schoenmakers

[11] 4,434,955

[45] Mar. 6, 1984

[54] MAGNETIC-TAPE CASSETTE

[75] Inventor: Johannes J. M. Schoenmakers, Eindhoven, Netherlands

[73] Assignee: U.S. Philips Corporation, New York, N.Y.

[21] Appl. No.: 386,144

[22] Filed: Jun. 7, 1982

[30] Foreign Application Priority Data

Jun. 18, 1981 [NL] Netherlands ............... 8102932

[51] Int. Cl.³ .................... G03B 1/04; G11B 15/32
[52] U.S. Cl. ............................. 242/199; 226/190
[58] Field of Search ..................... 242/197-200; 226/190, 196; 352/72, 73, 78 R; 360/93, 96.1, 132

[56] References Cited

U.S. PATENT DOCUMENTS 4,022,395  5/1977  Kishi ........................ 242/198
4,093,149  6/1978  Shroff et al. ................ 242/198
4,163,533  8/1979  Abe ......................... 242/198

Primary Examiner—Leonard D. Christian
Attorney, Agent, or Firm—David R. Treacy

[57] ABSTRACT

A magnetic tape cassette comprises a housing having an open front side and two adjacent reel hubs containing an amount of tape, a span of said tape extending along the front side; at one or at both corner points near the open front side front covers are pivotable between an open position, and a closed position which covers at least partly over the front opening; the span of the magnetic tape which extends along the open front side can be moved between an active position outside the housing and an inactive position in which the tape is disposed between the major walls of the housing. Each front cover is formed with a thrust portion which during the pivotal movement from the open position to the closed position presses against the span of magnetic tape which extends along the front side and thereby moves it from the active position to the inactive position.

1 Claim, 2 Drawing Figures

MAGNETIC-TAPE CASSETTE

BACKGROUND OF THE INVENTION

The invention relates to a magnetic-tape cassette comrpising: a housing having first and second flat parallel major walls, two side walls, a rear wall and a front side with front opening between the major walls; two rotatable reel hubs arranged adjacent each other between the major walls; a magnetic tape attached to the reel hubs, a span of said tape extending along said front opening in the magnetic tape cassette for co-operation with parts of a magnetic tape apparatus, and a front cover near a corner point near the front of the magnetic-tape cassette, which cover is pivotable about a pivotal axis perpendicular to the major walls, between an open position and a closed position for at least partly covering the front opening of the magnetic-tape cassette in the closed position, the span of said magnetic tape which moves along the front opening of the magnetic-tape cassette being movable from an active position (FIG. 2), in which it is located outside the housing of the magnetic-tape cassette, to an inactive position (FIG. 1), in which it is disposed between the major walls of the housing.

A magnetic-tape cassette of this kind is, for example, known from U.S. Pat. No. 4,022,395 (herewith incorporated by reference). This magnetic tape cassette comprises two front covers, one at each corner near the front. In the two major walls openings are formed for the passage of elements belonging to a magnetic tape apparatus, which elements can pull the magnetic tape out of the magnetic tape cassette over some distance. The two front covers are constantly urged towards the closed position by resilient means belonging to the magnetic-tape cassette. When the span of magnetic tape at the front of the magnetic-tape cassette is withdrawn from the magnetic-tape cassette, the two front covers are slightly swung open by the elements of the magnetic-tape apparatus.

Although the two front covers provide a certain degree of protection for the magnetic tape when the cassette is not disposed on a magnetic-tape apparatus, the openings in the major walls are such that the edges of the magnetic tape can be touched when handling the cassette. The edges of the magnetic tape are very vulnerable because magnetic tapes are generally very thin in relation to the width. When the known magnetic-tape cassette is used on a magnetic-tape apparatus the problem is encountered that, after recording or playback, steps must be taken to rewind the length of magnetic tape which has been withdrawn from the magnetic tape cassette back into the magnetic tape cassette before the magnetic-tape cassette can be removed from the apparatus. If this is not done a loop of magnetic tape would be outside the magnetic-tape cassette, which is likely to give rise to complications when removing the magnetic-tape cassette and which increases the likelihood of damage to the magnetic tape. Therefore the magnetic tape apparatus should be provided with a special control system which, in response to a command to terminate recording or playback, drives the reel hubs so that the loop is taken up. As a result, the known cassette is less suitable for simple magnetic tape equipment which does not have a special control system for returning the magnetic tape into the cassette from the active position to the inactive position after playback or recording.

SUMMARY OF THE INVENTION

It is an object of the invention to provide a magnetic-tape cassette of the type mentioned in the opening paragraph, which provides a better protection of the magnetic tape in the magnetic tape cassette and which is suitable for use both in more sophisticated magnetic-tape equipment and in simple magnetic-tape equipment.

In accordance with the invention the front cover is provided with a thrust portion which during the pivotal movement from the open position to the closed position presses against the span of magnetic tape which extends along the front side and moves it from the active position to the inactive position. In the magnetic-tape cassette in accordance with the invention one front cover is, or two front covers are, employed to return the magnetic tape from the active position outside the magnetic-tape cassette to an inactive position in which the tape is entirely inside the magnetic-tape cassette. When the front cover or front covers is or are opened the magnetic tape can be returned from the inactive position to the active position, so that no openings in the major walls of the magnetic tape cassette are necessary for the passage of threading elements of a magnetic tape apparatus. Consequently, the major walls near the front side of a magnetic-tape cassette may be fully closed, so that the edges of the magnetic tape, are fully covered when said tape is in the inactive position, that is inside the cassette.

The invention will be described in more detail, by way of example, with reference to the drawing.

DESCRIPTION OF THE PREFERRED EMBODIMENT

Figure 1:
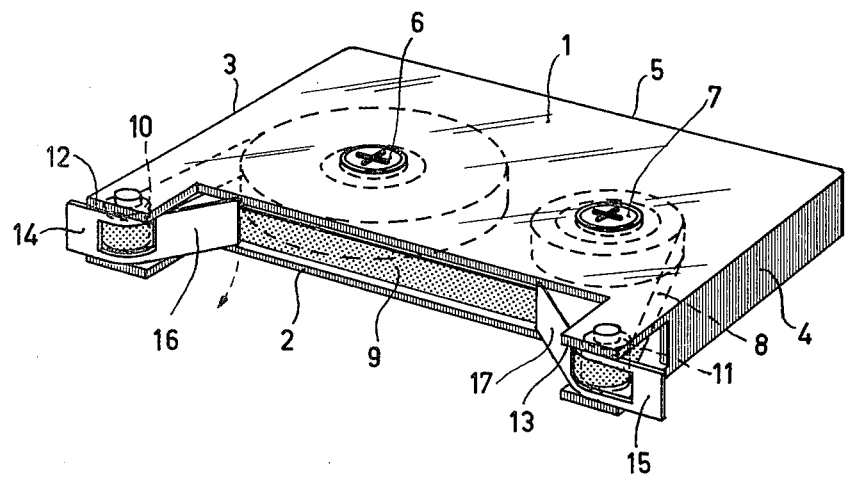
FIG. 1 is a perspective view of a magnetic-tape cassette in accordance with the invention comprising two front covers in a closed position.

The magnetic-tape cassette shown in the drawing comprises a housing having first and second parallel major walls 1 and 2, two side walls 3 and 4, one rear wall 5, and a front side with a front opening between the two major walls 1 and 2. Two rotatable reel hubs 6 and 7 are arranged adjacent each other between said major walls, which reels contain a magnetic tape 8 wound to form rolls of tape. A span 9 of the magnetic tape extends along the front opening and is wrapped around two tape guide elements 10 and 11. Near the corner points 12 and 13 of the magnetic-tape cassette front covers 14 and 15 are arranged, which are each pivotable about a pivotal axis perpendicular to the major walls 1 and 2 between a closed position (FIG. 1) and an open position (FIG. 2). In a closed position the front covers 14 and 15 partly cover the span 9 of magnetic tape at the front. The span 9 of magnetic tape which extends along the front opening of the magnitic-tape cassette is movable from the active position, see FIG. 2, in which it is disposed outside the housing of the magnetic-tape cassette, to an inactive position, see FIG. 1. In the inactive position the span 9 of magnetic tape is disposed between the major walls 1 and 2 of the housing, interiorly of a large opening formed between the corner points 12 and 13.

Figure 2:
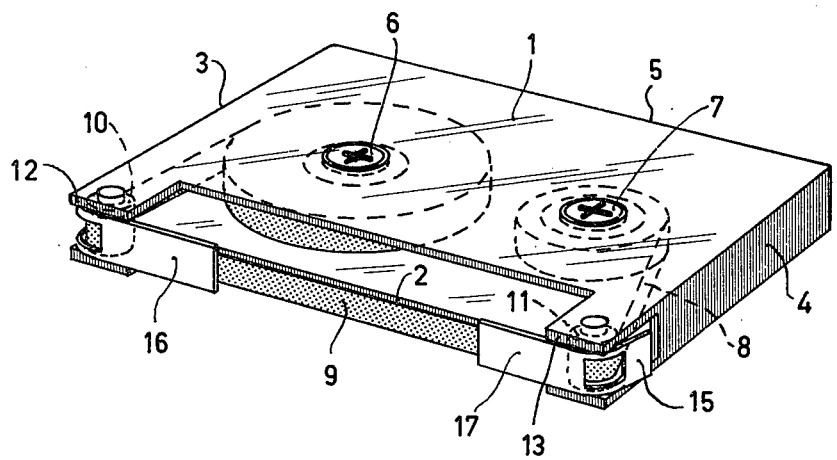
FIG. 2 shows the same perspective view with the front covers in the open position.

The front covers 14 and 15 are provided with a thrust portion 16 and 17 respectively near the free end, which portion during the pivotal movement from the open position to the closed position presses against the span 9 of magnetic tape and moves said span of tape from the active position of FIG. 2 to the inactive position of FIG. 1. In order to preclude damage to the magnetic tape the thrust portions 16 and 17 of the front covers 14 and 15 may be suitably rounded and may be provided with a slightly projecting rounded edge.

In the present embodiment of a magnetic tape cassette in accordance with the invention the major walls 1 and 2 have large openings between the corner points 12 and 13, so that the span 9 of the magnetic tape which extends along the front of the magnetic-tape cassette is accessible to elements of the magnetic tape apparatus over substantially the entire length of the span, behind the tape. Alternatively, it would be possible to make said openings smaller and to construct the major walls so that they locally cover the edges of the magnetic tape, both when it is in the active position and when it is in the inactive position.

What is claimed is:

1. A magnetic-tape cassette, comprising a housing having first and second flat parallel major walls (1, 2), two side walls (3, 4), a rear wall (5), and a front side with a front opening between the major walls, two rotatable reel hubs (6, 7) arranged adjacent each other between the major walls, a magnetic tape (8) attached to the reel hubs (6, 7), a span (9) of said tape extending along said front opening in the magnetic-tape cassette for cooperation with parts of a magnetic-tape apparatus, said major walls having at least one opening permitting access by elements of the magnetic tape apparatus behind the tape, the span (9) of said magnetic tape which extends along the front opening of the magnetic-tape cassette being movable from an active position, in which it is disposed outside the housing of the magnetic-tape cassette, to an inactive position, in which it is disposed between the major walls (1, 2) of the housing, at least one front cover (14, 15) near a corner point (12, 13) near the front of the magnetic-tape cassette, and means for pivoting said cover about a pivotal axis perpendicular to the major walls (1, 2) between an open position and a closed position, in which closed position said cover at least partly covers the front opening of the magnetic-tape cassette, characterized in that the front cover (14, 15) comprises a thrust portion (16, 17) which during the pivotal movement of the open position to the closed position presses against the span (9) of magnetic tape which extends along the front side and moves the tape from the active position to the inactive position, and said major walls are arranged such that in the inactive position of said tape the tape is disposed interiorly of said at least one opening, whereby the edges of said tape are fully covered when the tape is in the inactive position.

* * * * *

UNITED STATES PATENT AND TRADEMARK OFFICE
CERTIFICATE OF CORRECTION

PATENT NO. : 4,434,955
DATED : March 6, 1984
INVENTOR(S) : JOHANNES J.M. SCHOENMAKERS It is certified that error appears in the above—identified patent and that said Letters Patent is hereby corrected as shown below:

Claim 1, line 31,    Change "movement of" to --movement from--
(Col. 4, line 20)

Signed and Sealed this

Seventh Day of August 1984

[SEAL]

Attest:

GERALD J. MOSSINGHOFF

*Attesting Officer*     *Commissioner of Patents and Trademarks*